US 8,788,422 B2
Jul. 22, 2014

(12) United States Patent
Kalinichenko et al.

(54) IDENTIFYING PARTIAL USER-ENTERED DATA

(75) Inventors: Boris Kalinichenko, Jamaica Plain, MA (US); Joseph Ferra, Dover, MA (US)

(73) Assignee: FMR LLC, Boston, MA (US)

( * ) Notice: Subject to any disclaimer, the term of this patent is extended or adjusted under 35 U.S.C. 154(b) by 2264 days.

(21) Appl. No.: 10/811,263

(22) Filed: Mar. 26, 2004

(65) Prior Publication Data
US 2005/0216412 A1    Sep. 29, 2005

(51) Int. Cl.
*G06F 21/00* (2013.01)
*G06Q 10/00* (2012.01)

(52) U.S. Cl.
USPC .................................. 705/50; 705/5

(58) Field of Classification Search
USPC ............................. 705/1–45, 50–79
See application file for complete search history.

(56) References Cited

U.S. PATENT DOCUMENTS

| | | | | |
|---|---|---|---|---|
| 4,360,875 | A * | 11/1982 | Behnke | 455/456.5 |
| 5,168,451 | A * | 12/1992 | Bolger | 701/117 |
| 5,253,165 | A * | 10/1993 | Leiseca et al. | 705/5 |
| 6,754,634 | B1 * | 6/2004 | Ho | 705/6 |
| 7,035,384 | B1 * | 4/2006 | Scherer | 379/88.19 |
| 7,231,355 | B2 * | 6/2007 | Schoen et al. | 705/1 |
| 2001/0034623 | A1 * | 10/2001 | Chung | 705/5 |
| 2002/0010604 | A1 * | 1/2002 | Block | 705/6 |
| 2002/0095326 | A1 * | 7/2002 | Katz | 705/9 |
| 2002/0186144 | A1 * | 12/2002 | Meunier | 340/825.28 |
| 2003/0036930 | A1 * | 2/2003 | Matos et al. | 705/5 |
| 2003/0055689 | A1 * | 3/2003 | Block et al. | 705/5 |
| 2004/0039612 | A1 * | 2/2004 | Fitzgerald et al. | 705/5 |
| 2004/0073440 | A1 * | 4/2004 | Garbers et al. | 705/1 |
| 2004/0102979 | A1 * | 5/2004 | Robertson et al. | 705/1 |
| 2004/0117332 | A1 * | 6/2004 | Himebaugh | 705/417 |
| 2004/0158483 | A1 * | 8/2004 | Lecouturier | 705/6 |
| 2005/0113122 | A1 * | 5/2005 | Korneluk | 455/518 |
| 2006/0059023 | A1 * | 3/2006 | Mashinsky | 705/5 |
| 2006/0182055 | A1 * | 8/2006 | Coffee et al. | 370/328 |

* cited by examiner

*Primary Examiner* — Alexander Kalinowski
*Assistant Examiner* — Murali Dega
(74) *Attorney, Agent, or Firm* — Fish & Richardson P.C.

(57) ABSTRACT

There are methods and apparatus, including computer program products, for service improvement techniques for a transportation service provider using mobile devices. In one aspect there is received user-entered data for at least one field present in a provided electronic form. The form includes a link that, when activated, establishes a voice channel between the passenger and a customer representative and provides a unique identifier associated with the user-entered data that enables a customer representative to retrieve the user-entered data. In another aspect, there is a graphical representation that is transmitted to a customer or a driver to facilitate execution of a reservation of a transportation service to be provided to the customer by the driver. In another aspect, there is a location range received from a wireless handheld device associated with a driver and data received from the driver indicative of a more accurate location within the location range.

16 Claims, 2 Drawing Sheets

IDENTIFYING PARTIAL USER-ENTERED DATA

BACKGROUND

Figure 1:
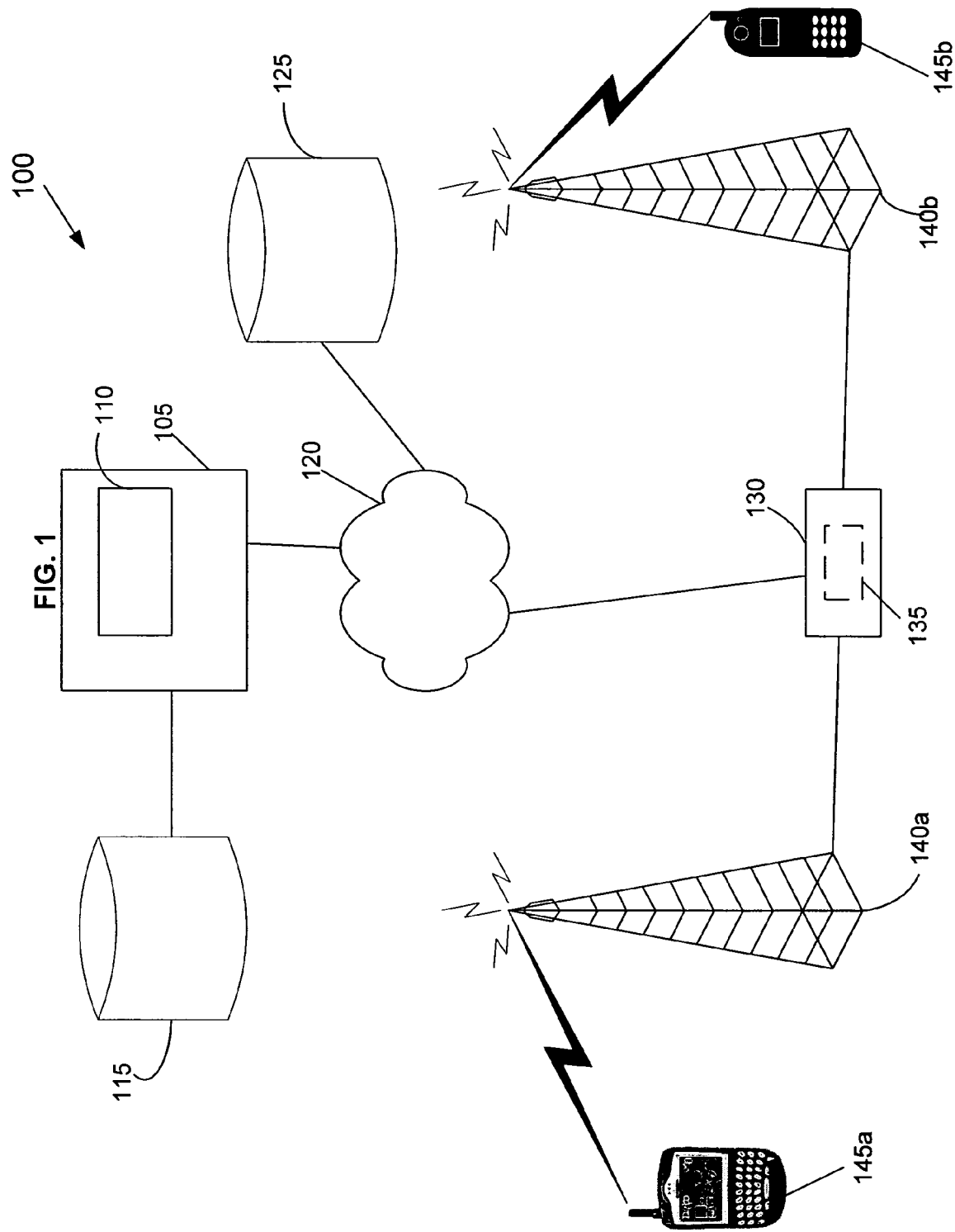

The description relates to identifying partial user-entered data.

Taxi services use fare meters and wait for a rider at a taxi stand or pick-up a rider who has flagged them when the taxi is not carrying a rider. Private transportation providers prearrange to pick-up riders at predefined locations (e.g., pick-up locations) and to transport the riders to predefined locations (e.g., drop-off locations). To identify themselves to the riders, the drivers typically hold signs bearing the riders' last names. Private transportation providers work well when there are no deviations from the prearranged plans.

SUMMARY OF THE INVENTION

In one aspect, there is a method that includes receiving user-entered data for at least one field present in a provided electronic form and providing a link that, when activated, establishes a voice channel between the passenger and a customer representative and provides a unique identifier associated with the user-entered data that enables a customer representative to retrieve the user-entered data.

Additional examples can include any combination of one or more of the following features. Retrieving, by a computing device associated with the customer representative, the user-entered data based on the unique identifier. Authenticating a user before providing the electronic form. Providing the electronic form for display on a wireless handheld device. Receiving user-entered data corresponding to a pick-up location, a drop-off location, a date service is required, and a time service is required. The unique identifier can include an extension of a phone number. The electronic form can be for making a reservation with a transportation service provider. The reservation can be associated with reserving a vehicle and a driver.

In another aspect there is a system that includes a first computing device. The first computing device is adapted to display an electronic form, receive user-entered data for at least one field present in the electronic form, and display a link that, when activated, calls a customer representative and provides a unique identifier associated with the user-entered data that enables a second computing device to retrieve the user-entered data based on the unique identifier.

Additional examples can include any combination of one or more of the following features. A second computing device adapted to receive the unique identifier, and to retrieve the user-entered data based on the unique identifier. The first computing device can include a wireless handheld device. The unique identifier can include identification of a voice channel so that the voice channel cannot be accessed by a unauthorized person. The first computing device can have a capability to accept input via voice activated commands. The computing devices can be adapted to perform any combination of the methods described herein.

In another aspect, there is a computer program product, tangibly embodied in an information carrier. The computer program product includes instructions operable to cause data processing apparatus to provide an electronic form, receive user-entered data for at least one field present in the electronic form and provide a link that, when activated, establishes a voice channel between the passenger and a customer representative and provides a unique identifier associated with the user-entered data that enables a customer representative to retrieve the user-entered data.

Additional examples can include any combination of one or more of the following features. The instructions can be further operable to cause the data processing apparatus to enable the customer service representative to entering additional information not included in the user-entered data to make a reservation to enable dispatching a car and billing the passenger accordingly. The instructions can be further operable to cause the data processing apparatus to retrieve, by a computing device associated with the customer representative, the user-entered data based on the unique identifier. The instructions can be further operable to cause the data processing apparatus to authenticate a user before providing the electronic form. The instructions can be further operable to cause the data processing apparatus to provide the electronic form for display on a wireless handheld device. The unique identifier can include an extension of a phone number. The electronic form can be for making a reservation with a transportation service provider. The computer program product can include instructions operable to cause data processing apparatus to perform any combination of the methods described herein.

In another aspect, there is a method that includes transmitting to a customer or a driver a graphical representation to facilitate execution of a reservation of a transportation service to be provided to the customer by the driver.

Additional examples can include any combination of one or more of the following features. Selecting a reservation associated with the customer. Associating the driver with the reservation. Transmitting the graphical representation in response to a time associated with the reservation. Transmitting the graphical representation to a wireless handheld device. The graphical representation can include a photograph of the driver associated with the reservation. The graphical representation can include a photograph of the customer associated with the reservation. The graphical representation can include a photograph of a vehicle, including the license plate, associated with the reservation. The graphical representation can include a map associated with the reservation. The map can include a pick-up location associated with the reservation. The pick-up location can include a location in an airport. The map can include directions from a location associated with the customer to a location associated with the driver. The graphical representation can include a text message from the customer. The graphical representation can include a text message from the driver.

In another aspect, there is a system that includes a computing device. The computing device is adapted to select a reservation with an associated customer and an associated driver and transmit a graphical representation to the associated customer or the associated driver.

Additional examples can include any combination of one or more of the following features. The system can include a data communication channel through the computing device, the data communication channel linking a first wireless handheld device associated with the customer and a second wireless handheld device associated with the driver. The system can include a data communication channel through the computing device, the data communication channel linking a first wireless handheld device associated with the customer and a second wireless handheld device associated with the driver. The computing device can be adapted to perform any combination of the methods described herein.

In another aspect, there is a computer program product, tangibly embodied in an information carrier. The computer program product includes instructions operable to cause data processing apparatus to transmit to a customer or a driver a graphical representation to facilitate execution of a reservation of a transportation service to be provided to the customer by the driver Additional examples can include any combination of one or more of the following features. The instructions can be further operable to cause the data processing apparatus to select a reservation associated with the customer and to associate the driver with the reservation. The instructions can be further operable to cause the data processing apparatus to confirm that the driver and the customer do not require any additional information to facilitate execution of the reservation. The instructions can be further operable to cause the data processing apparatus to cause a customer service representative to contact the passenger and assist the passenger with execution of a reservation. The computer program product can include instructions operable to cause data processing apparatus to perform any combination of the methods described herein.

In another aspect, there is a method including receiving a location range from a wireless handheld device associated with a driver and receiving data from the driver indicative of a more accurate location within the location range.

Additional examples can include any combination of one or more of the following features. Displaying entries on the wireless handheld device based on the location range. Generating the data based on interaction of the driver with the displayed entries. The entries can include street names within the location range. The entries can include street names the determination of which are based on an accuracy of location detection mechanism within the wireless handheld device. The interaction of the driver can be performed with a single keystroke.

Selecting a reservation associated with the driver. Modifying a fare associated with the reservation based on the accurate location. Printing a receipt with the modified fare in a vehicle associated with the driver. Determining the location range using a Global Positioning System (GPS), the location range being limited by an accuracy of the GPS. Generating the data by generating a list of landmarks or street names falling within the location range and eliminating entries from the list based on interaction by the driver. Eliminating entries from the list based on a single keystroke by the driver.

In another aspect, there is a system that includes a computing device. The computing device is adapted to receive a location range from a wireless handheld device associated with a driver and receive data from the driver indicative of a more accurate location within the location range.

Additional examples can include any combination of one or more of the following features. The computing device can be adapted to generate a list of landmarks or street names within the location range. The computing device can be adapted to perform any combination of the methods described herein.

In another aspect, there is a computer program product, tangibly embodied in an information carrier. The computer program product includes instructions operable to cause data processing apparatus to receive a location range from a wireless handheld device associated with a driver and receive data from the driver indicative of a more accurate location within the location range.

Additional examples can include any combination of one or more of the following features. The instructions can be further operable to cause the data processing apparatus to display entries on the wireless handheld device based on the location range and generate the data based on interaction of the driver with the displayed entries. The entries can include street names within the location range. The entries can include street names the determination of which are based on an accuracy of location detection mechanism within the wireless handheld device. The interaction of the driver can be performed with a single keystroke. The instructions can be further operable to cause the data processing apparatus to select a reservation associated with the driver. The instructions can be further operable to cause the data processing apparatus to modifying a fare associated with the reservation based on the accurate location. The instructions can be further operable to cause the data processing apparatus to print a receipt with the modified fare in a vehicle associated with the driver. The computer program product can include instructions operable to cause data processing apparatus to perform any combination of the methods described herein.

Implementations can realize one or more of the following advantages. When a customer contacts a customer representative, she does not have to be re-authenticated. Nor does the customer have to repeat to the customer representative information she has already entered. Nor does the customer service representative have to make an effort to look up the customer data that was entered by the customer before the customer representative was contacted. A customer and driver can verify each other and the vehicle using photographs received independently from the service provider. A customized map can be provided to the customer at a time when the customer needs the map. A driver can easily enter changes in location using very limited amount of keystrokes, making the entry simple, even if only a numeric keyboard on a mobile phone is used to enter data. These features can be provided to a wireless handheld device, that the customer and driver typically carry on a daily basis. Deviations from a prearranged plan can be accommodated and changed, in a real-time manner to improve customer satisfaction and increase vehicle utilization by rearranging cars and upcoming rides. One implementation provides all of the above advantages.

The details of one or more examples are set forth in the accompanying drawings and the description below. Further features, aspects, and advantages of the invention will become apparent from the description, the drawings, and the claims.

DESCRIPTION

Figure 2:
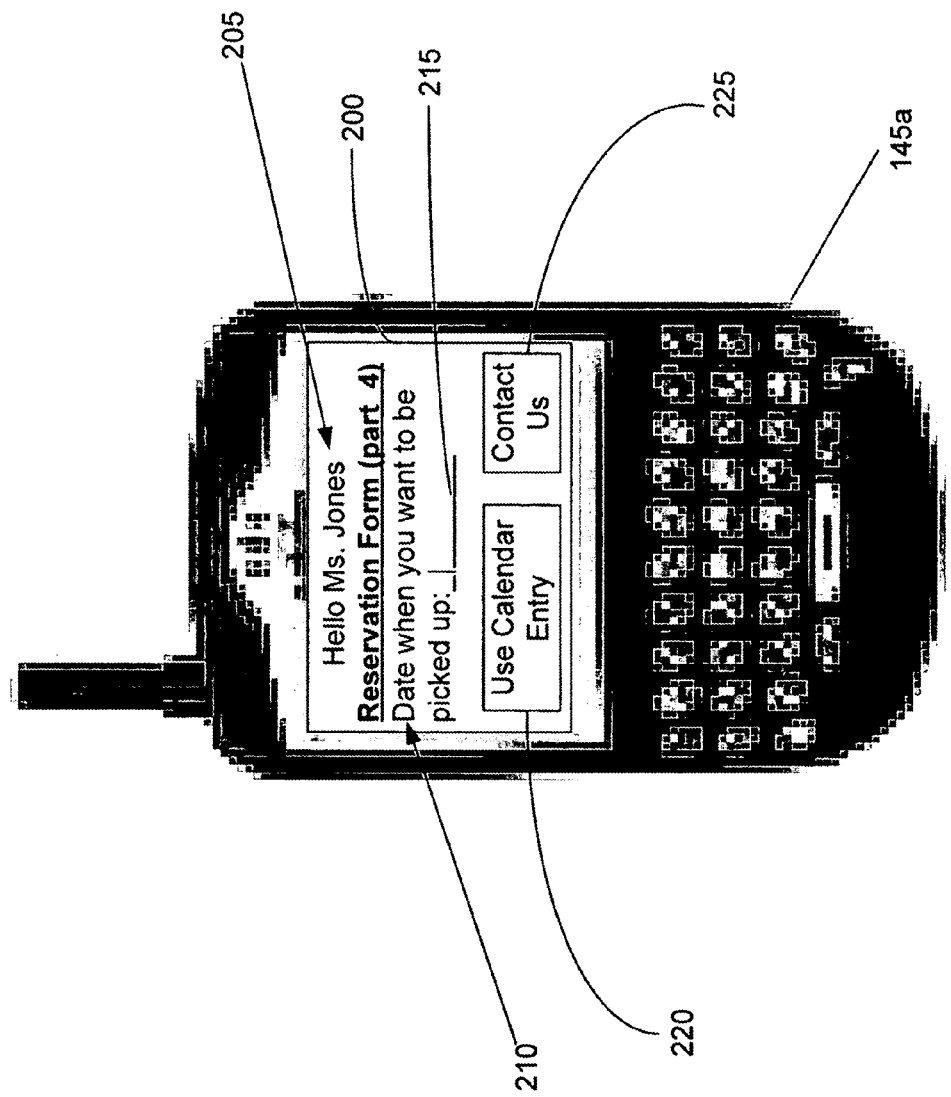

FIG. 1 is a block diagram of a communications system.
FIG. 2 is a block diagram of a wireless handheld device.
In FIG. 1, within a communications system 100, a server 105 includes a dispatcher application program 110. The dispatcher application program 110 (dispatcher for short) is used by a transportation service provider to match a rider's reservation for transportation services with an available car and driver. As described in more detail below, a customer may make a reservation, for example, to be picked up at an airport when the customer's flight arrives. The dispatcher 110 finds a car and driver available at the time when the flight arrives and provides instructions to that driver, either electronically or through a human interface, to be at the airport when the flight arrives. Both the reservation and instructions to the driver also identify a destination to which the driver will take the customer.

The dispatcher 110 obtains information about reservations, drivers, and customers from a persistent storage module 115, such as a database, with which the server 105 is in communication. The server 105 is also in communication with a communications network 120, such as the Internet. Using the network 120, the dispatcher 110 can obtain information from another system 125 also connected to the network 120, such as flight information from an airport or an airline. Using this third-party information, the dispatcher 110 can obtain not only the date and time of the flight, which the customer typically includes in the reservation, but also the gate number and the status of the flight, such as on-time or delayed for a specified period of time. As described in more detail below, this information can be used to arrange for the driver and car to be at a waiting location at the airport and to determine a route in real-time (e.g., as the customer exits the plane) to get the customer through the airport to the location of the assigned car and driver. If the conditions of the customer pick up change due to changes in the customer plans, such as flight delays, changes to the assigned flight arrival terminals, etc., then this change can be automatically dispatched to the driver so the driver can accommodate new customer needs. The above change can be automatically alerted to the customer's wireless device or any other means of getting in contact with the customer, so the customer is aware that the service company has accommodated the customer's changed needs.

The network 120 is also in communication with another communications network 130. The network 130 includes a telecommunications network, which can include for example a public switched telephone network (PSTN) 135, as well as base stations and/or wireless access points 140a and 140b. The customer uses a wireless handheld device 145a (e.g., a BlackBerry 6510™ wireless handheld) to communicate with the dispatcher 110 (e.g., receive and transmit data and voice) using networks 120 and 130. The driver also uses a wireless handheld device 145b (e.g., a mobile telephone) to communicate with the dispatcher 110 using networks 120 and 130.

Dispatcher 110 allows the customer to enter a transportation reservation using wireless the handheld device 145a by requesting a reservation form. To request a reservation form, the customer makes contact with server 105 and server 105 requires that the customer go through an authentication process (e.g., entering user credentials such as a user ID and a password). Once the user is authenticated, the server 105 passes the authenticated identity of the customer to dispatcher 110, along with the request for a reservation form. Dispatcher 110 can obtain personal data associated with the identified customer, such as name and preferences, from the database in the storage module 115. Using any applicable personal data, dispatcher 110 transmits a reservation form (or a portion thereof) to the wireless handheld device 145a of the customer. The choice of what items to include and what information to request on the form may be based in part on the personal data.

FIG. 2 shows an example screenshot of a portion of the reservation form on a display 200. The display includes a top portion 205 that displays the name of the customer, using the personal data obtained from the authentication process. The center portion 210 of the display 200 includes a portion of the reservation form, with a user input section 215, at which the cursor is located. The portion shown requires the customer to enter a date on which the customer wants to be picked up. How many user input sections of the reservation form are shown at one time is a function of the screen size of the wireless handheld device 145a. In the illustrated example, the user can enter a date in the user input section 215 or the reservation form includes a link 220 to a calendar entry screen, which displays a graphic of a calendar when activated. The graphic of a calendar allows the user to move the cursor to and click on the day in the calendar on which the customer wants to be picked up. When the customer has entered a date, that data is transmitted to server 105 and stored in storage module 115. Some examples of typical data to make a reservation are a pick-up location, a drop-off location, a pick-up time, special requests, such as a child seat requirement or an authorization to the driver to wait for the customer, billing information (e.g., credit card number or a corporate account number), flight information (e.g., if pick-up or drop-off location is an airport), information about additional passengers, and information on the stops to made to pick up or drop off additional passengers.

Also displayed on screen 200 is a link 225, labeled "Contact Us", that contacts a service representative when activated. This link 225 is available to the customer on each screen of the reservation form, should the customer encounter any problems or just decide that she no longer wants to enter the form using her handheld device 145a. When the customer activates the link 225, the handheld device 145a calls a customer service representative using network 130. To accomplish this task, the link 225 has an associated phone number that is dialed by the handheld device 145a.

In addition to the phone number, the link 225 has an associated identifier (ID). This ID corresponds to the stored data of the particular reservation form being filled out by the customer, which, in the illustrated example, is Ms. Jones. This ID enables the customer service representative to obtain all of the user-entered data that Ms. Jones has already entered into the current reservation form. In other words, by using this ID, the data already entered by Ms. Jones and stored in storage module 115 can be identified and retrieved. By enabling the customer service representative to obtain all of the user-entered data, Ms. Jones does not have to repeat any of that information. This advantageously creates a seamless transition from customer entered data to service representative entered data to complete the reservation form and leads to less frustration by the customer in attempting to enter a reservation herself.

An example of the information to be displayed to the customer service representative is displayed in Table 1.

TABLE 1

| Reservation for Ms. Jane Smith. ID #1234512345 | |
|---|---|
| Modify | |
| Pick up location | |
| Pick-up Date: | Monday, Apr. 05, 2004 |
| Pick-up Time: | 03:30 PM |
| Address: | 245 Some St. |
| City: | Some Town |
| State/Province: | Some State |
| Country: | USA |
| Drop off location | |
| Airport: | Not specified |
| Airline: | Not Specified |
| Flight #: | Not Specified |
| Passengers | |
| Passenger Name: | Ms. Jane Smith |
| Contact Number: | (123) 123-1234 |
| # of Passengers: | 1 |
| Payment Information | |
| Card Type: | VISA |
| Card Number: | **************11111 |
| Card Exp Date: | June 2005 |
| Card Holder Name: | Jane Smith |
| Special Requirements | |
| Child Seat | Not Specified |
| Authorized wait: | Not Specified |

The example of the data in Table 1 has several pieces of information with a "Not Specified" value. This value indicates that this data is to be filled in by the service representative based on the conversation between the representative and the customer. In other words, the user did not yet enter that data.

One way to provide the ID to the service representative is to add a unique extension to the phone number. For example, the number (xxx) xxx-8000 may be used to reach the phone system of the customer service organization. The phone system can have all extensions numbered from 8000 to 8999. This provides 1000 unique IDs at any given time. When the user initiates a request, an ID is assigned from among the 1000 available IDs and stored in the server. The phone number embedded in the link sent to the handheld device contains the ID. Then, when the handheld device dials an extension, say (xxx) xxx-8345, the call is routed by the phone system to the next available customer service representative. The extension that was called, namely 8345, is also transmitted to the customer service representative. The customer service representative also has access to server 105 (e.g., using network 120). The customer service representative sends a request to server 105 for the user-entered data associated with that extension. The request can be made automatically (e.g., the customer service representative's computer sends a request to server 105 as soon as the call is received and the extension is identified).

Other IDs may be used, depending on the type and capabilities of the handheld device. For example, a unique ID of the handheld device 145*a* can be the phone number of the handheld device 145*a* calling the customer service representative. In this example, the phone number is also provided to the dispatcher 110 so that the dispatcher 110 can associate the user-entered data stored in storage module 115 with the phone number of the customer's handheld device 145*a*. Then, the customer service representative (or his computer) provides the customer's phone number to the server 105 for retrieval of the associated stored data (or the request is made automatically).

Once a reservation is complete (e.g., enough information to dispatch a car, such as pick-up point, drop-off point, pick-up time, special requests for a car equipment and the billing information) is entered into the database located in storage module 115, then the dispatcher 110 matches that reservation to an available driver (e.g., a driver who is working the day of the reservation, does not have any assignment at the requested pick-up time, and can get to the pick-up location in time from the drop-off location of the driver's immediately preceding assignment) and an available vehicle (e.g., a vehicle that is not being serviced at the particular day and time of the reservation). At some predetermined time before the required pick-up time, the dispatcher 110 separately notifies the customer and the driver of the match. At a minimum, the driver has to be notified of the identity of the customer and the pick-up location to provide enough time for the driver to arrive at the pick-up location by the required pick-up time. Similarly, the customer has to be notified of the identity of the driver and location of the vehicle to provide enough time for the customer to arrive at the pick-up location by the required pick-up time. To calculate the minimum lead-time needed, the dispatcher 110 obtains distance information between points (e.g., distance between driver's preceding drop-off location and next pick-up location and distance between customer's arrival gate and the pick-up location) from storage module 115 or from other third-party systems 125 using network 120. Also, in the case where the customer is being picked up at an airport, the dispatcher 110 obtains flight information about the arrival gate and the status of the flight.

The dispatcher 110 can make last minute changes to the match since the dispatcher 110 does not need to notify the driver or the customer until the minimum lead-time is reached. If a flight is going to be delayed for a long period of time, the dispatcher 110 can divert the driver to another customer and thus avoid costs if the driver had to wait around until the flight arrived.

To notify the driver and the customer of a match or a revised match, the dispatcher 110 sends appropriate graphical representations to the driver and the customer. The graphical representations may include maps or photographs or both, and other information. The dispatcher 110 obtains the graphical representations from the storage module 115. The dispatcher 110 pushes the graphical representations to the handheld devices 145*a* and 145*b* in the same way that new emails, text messages, and/or phone calls are pushed to the handheld devices 145*a* and 145*b*.

Taking the customer first, the dispatcher 110 can send a map to the customer's handheld device 145*a* that shows directions to get from the arrival gate to the vehicle and the driver waiting for the customer. This is especially useful when the customer is not familiar with the airport at which she arrives. Further, the dispatcher 110 can obtain from the other system 125 information such as the baggage carousel to which the customer's baggage will be sent. Then the dispatcher 110 can include in the map directions from the gate to the correct baggage carousel and directions from the baggage carousel to the vehicle and driver. The dispatcher 110 also transmits a photograph of the assigned driver to the customer's handheld device 145*a*. This way, the client is sure that she is going with the correct and legitimate driver. As a further verification, the dispatcher 110 also may send one or more photographs of the vehicle, which can include a shot of the license plate, again so the customer has peace of mind that she is going with the correct driver. Once a driver is matched with a passenger, the passenger can send a message to the driver, for example notifying the driver that the passenger will be 20 minutes late from the gate as a result of unplanned conversation that the passenger got engaged into with his prospective client. The communication between the driver and the passenger can happen through the dispatcher 110, thus preserving service company confidential information, such as the driver phone number.

Similarly, the dispatcher 110 transmits a photograph of the customer to the handheld device 145*b* of the driver. This way, the driver can be sure that he is picking up the correct customer. The dispatcher 110 can also transmit a map of the pick-up location to the driver so that the driver knows where to pick-up the customer. If, for example, the driver's handheld device 145*b* cannot display a picture of a map, then a representation in text can be provided. By providing maps to both the driver and the customer, the dispatcher 110 ensures that both the driver and the customer have the same identical pick-up location. Should problems arise, such as a delay in baggage pick-up causing the driver to have to move his vehicle, the dispatcher 110 can provide new locations in real-time to ensure the eventual encounter of the driver and the customer. In particular the dispatcher 110 can send an alert to the customer on encounter of plane arrival delay to let that customer know that the car is waiting for the customer. If the delay is long enough for the driver to complete another assignment, the new assignment can be sent to the driver. The dispatcher 110 can also send alerts to the customer notifying the customer that the driver is 5 minutes away from the pick-up point, at the pick-up point, and the exact location of the pick-up point (e.g., front office building entrance, parking lot behind the office building, etc.).

If the driver moves the vehicle to a new pick-up location (e.g., was parked longer than the maximum standing time), the driver notifies the dispatcher 110 of the new location. To determine the new location, the vehicle and/or the handheld device 145b is equipped with a location determining device, such as a global positioning system (GPS), that can determine a location to within a certain range of accuracy. For example, a GPS can determine a location to within a 300-foot radius. To provide a more exact location to the customer, the dispatcher 110 transmits one or more display screens, as described below, to the driver's handheld device 145b to determine a more accurate location, for example, within a 10-foot radius.

To generate the display screens, the dispatcher 110 determines which streets are within the location range (e.g., the streets within the 300-foot radius). The dispatcher 110 generates a screen that enables a simple input by the driver to determine the accurate location. For example, if handheld device 145b is a mobile telephone, then dispatcher 110 generates a list of streets, with each street corresponding to a different number. The driver then selects the number, using the phone keypad, that corresponds to the street on which the vehicle is located. If the vehicle is located at a specific address, then the next display screen can simply ask the driver to input the number of the address at which the vehicle is located. If the street has portions that do not have addresses, then a list of landmarks can be presented to the driver, again with a number corresponding to each of the landmarks. The driver enters the number and then the dispatcher 110 can provide an updated map to the handheld device 145a of the customer providing directions to the landmark at which the vehicle is located.

These same techniques of determining an accurate location can be used when the customer requests that the driver deviate from the reservation drop-off location. For example, in the late flight scenario, the customer may want to go directly to the office, instead of going to her hotel first. This change in drop-off location can change the fare the customer is charged for the car and driver. Further, the customer may require an immediate receipt with the revised fare. In one example, the driver drives the customer to the new drop-off location. The GPS determines the location range and then the driver enters some input to determine an accurate location, using for example the menu-with-corresponding-numbers approach as described above. When the dispatcher 110 determines the accurate location (e.g., a specific address with street and number), the dispatcher 110 determines a new fare and transmits the new fare to the handheld device 145b. If an immediate receipt is needed, the handheld device 145b can be connected to a portable printer and then, with the new fare stored in the handheld device 145b, the driver can print out a receipt. Alternatively, the printer itself can be a wireless handheld device that receives the value for the new fare and directions to print a receipt directly from the dispatcher 110 over the networks 120 and 130.

The above-described techniques can be implemented in digital electronic circuitry, or in computer hardware, firmware, software, or in combinations of them. The implementation can be as a computer program product, i.e., a computer program tangibly embodied in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps can be performed and apparatus can be implemented by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special purpose logic circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer or handheld device having a display device, e.g., a CRT (cathode ray tube) or LCD (liquid crystal display) monitor, for displaying information to the user and a keyboard and a pointing device, e.g., a mouse or a trackball, by which the user can provide input to the computer or handheld device (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques and processes (e.g., dispatcher 110) can be implemented in a distributed computing system that includes a back-end component, e.g., as a data server, and/or a middleware component, e.g., an application server, and/or a front-end component, e.g., a client computer or handheld device having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. The alternative examples are for illustration only and not to limit the alternatives in any way. The steps of the invention can be performed in a different order and still achieve desirable results.

What is claimed is:

1. A computer-implemented method comprising:
receiving, by a wireless handheld device, an electronic form, the electronic form including at least one field for accepting user entered data and a link that when activated establishes a voice channel between the user and a customer representative, the link including a unique identifier individually assigned to a user;
sending user-entered data for at least one field present in the electronic form to a server;
receiving by the wireless handheld device an activation of the link; and
establishing, by the wireless handheld device based at least in part on the activation of the link, a voice communication with a customer service representative, including transmitting the unique identifier individually assigned to the user, in response to the activation.

2. The method of claim 1, comprising retrieving, by a computing device associated with the customer representative, the user-entered data based on the unique identifier.

3. The method of claim 1, further comprising authenticating the user with the server before transmitting the electronic form.

4. The method of claim 1 in which the unique identifier comprises an extension of a phone number.

5. The method of claim 1 in which the electronic form is for making a reservation with a transportation service provider.

6. The method claim 5 in which sending user-entered data comprises sending user-entered data corresponding to a pick-up location, a drop-off location, a date service is required and a time service is required.

7. The method of claim 5 in which the reservation is associated with reserving a vehicle and a driver.

8. A system comprising:
a first computing device programmed to:
display an electronic form, the electronic form including at least one field for accepting user entered data and a link that when activated establishes a voice channel between the user and a customer representative, the link including a unique identifier individually assigned to a user
send user-entered data for at least one field present in the electronic form,
display a link that when activated establishes a telephonic call to a customer representative and provides the unique identifier individually assigned to the user and associated with the user-entered data that enables a second computing device to retrieve and display the user-entered data based on the unique identifier;
receive an activation of the link; and
establish, by the first computing device, a voice communication with a customer service representative, including transmitting the unique identifier, individually assigned to the user in response to the activation.

9. The system of claim 8, further comprising:
a second computing device adapted to:
receive the unique identifier,
retrieve the user-entered data based on the unique identifier, and
display the user-entered data.

10. The system of claim 9 in which the first computing device comprises a wireless handheld device.

11. The system of claim 8 in which the unique identifier comprises identification of a voice channel so that the voice channel cannot be accessed by an unauthorized person.

12. The system of claim 8 in which the first computing device has a capability to accept input via voice activated commands.

13. A computer program product, the computer program product comprising instructions operable to cause data processing apparatus to:
receive an electronic form the electronic form including at least one field for accepting user entered data and a link that when activated establishes a voice channel between the user and a customer representative, the link including a unique identifier individually assigned to a user;
send user-entered data that is entered for at least one field in the electronic form to a server;
receive an activation of the link; and
establish based at least in part on the activation of the link a voice communication with a customer service representative, including transmitting the unique identifier individually assigned to the user, in response to the activation.

14. The computer program product of claim 13, wherein the instructions are further operable to cause the data processing apparatus to authenticate the user with the server before providing the electronic form.

15. The computer program product of claim 13, wherein the unique identifier comprises an extension of a phone number.

16. The computer program product of claim 13, wherein the electronic form is for making a reservation with a transportation service provider.

* * * * *